June 6, 1961  H. C. JENT  2,986,971
SPECTACLES HAVING ADJUSTABLE BRIDGE SUPPORT
Filed Dec. 26, 1956
FIG. 1.
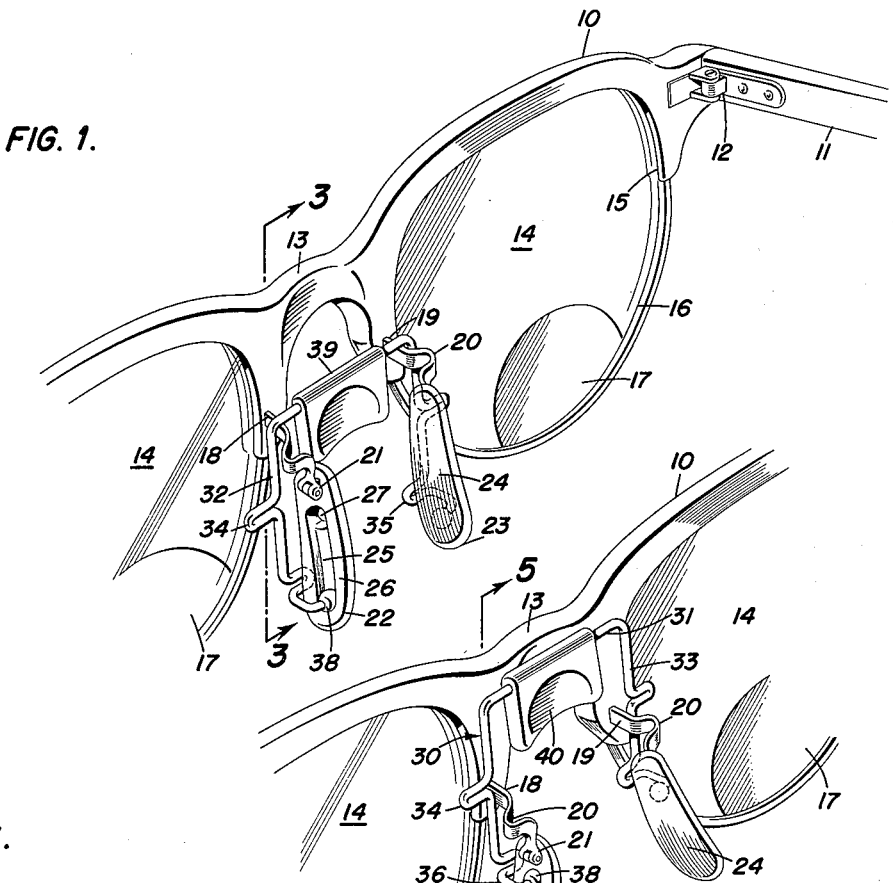
FIG. 3.
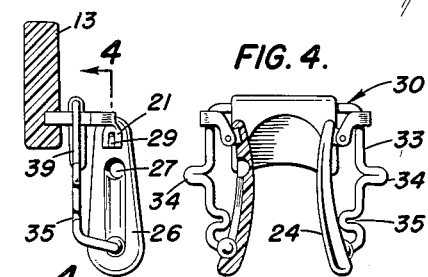
FIG. 4.
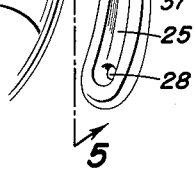
FIG. 2.
FIG. 5.
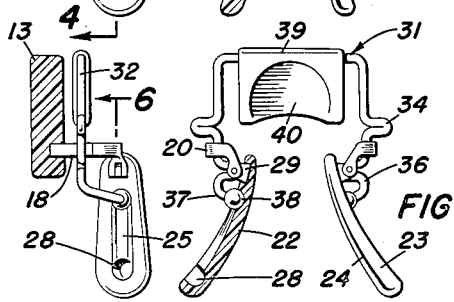
FIG. 6.
HERMAN C. JENT
INVENTOR
BY David Rabin
ATTORNEY 2,986,971
Patented June 6, 1961

2,986,971
SPECTACLES HAVING ADJUSTABLE BRIDGE SUPPORT
Herman C. Jent, 1540 Ebert St., Winston-Salem, N.C.
Filed Dec. 26, 1956, Ser. No. 630,522
8 Claims. (Cl. 88—43)

The present invention relates to spectacles having multifocal lenses and relates more particularly to the combination of a spectacle frame in which multifocal lenses are supported with means on the frame for adjusting the elevation of the area of the lens through which the wearer may view.

Various types of mechanisms have been devised to eliminate the necessity for a person who wears bifocal eye glasses from elevating his head on those occasions when it is necessary to utilize the reading section or near vision lens portions of bifocal lenses. It will become apparent that one must tilt one's head rearwardly to utilize the near vision lenses that are normally ground in the lower section of a full lens. Many of the auxiliary mountings employed to accomplish the desirable end result of eliminating the necessity of tilting the head rearwardly during close vision use requires either the removal of the spectacles completely to make the requisite adjustment to the mechanism or a complex intricate means is employed to reposition an adjusting mechanism to another position on the wearer's nose.

Therefore, the present invention provides a spectacle adjusting auxiliary bridge assembly for elevating a spectacle frame without removing the spectacles and retaining substantially the same position of orientation on the nose of the wearer.

Another object of this invention is the provision of a spectacle frame in which nose pads are retained in position, without elevating or depressing, to raise the frame to a close viewing position.

Yet another object of the present inventive concept is the provision of a freely movable auxiliary bridge that is readily manipulable by a single finger to the raised or lowered position without removing the spectacles during reorientation.

A further objective of this invention is the provision of an adjustable bridge member that is vertically movable between limits for use in cooperation with pivotally connected nose pads on a spectacle frame for elevating the frame to permit viewing through the lower section of a bifocal lens.

Still other objects of the present invention are to provide a conventional spectacle frame construction with a minor structural modification to enable a wearer to utilize the lower sections of multifocal lenses with a minimum of difficulty and expense, a construction that is sturdy but simple and requires a minimum amount of maintenance; one in which the components constituting the assembly may be disassembled with facility for cleansing purposes; an auxiliary frame that is virtually imperceptible on the conventional frame and does not impair the wearer's vision; and one that is comfortable to wear for prolonged periods in any position due to its compactness, lightweight and inherent functional design.

The present inventive concept contemplates the use of a conventional spectacle frame in which bifocal lenses are mounted with projecting brackets for supporting nose engaging pads in the arched bridge between lenses. The nose pads are pivotally connected on the back sides thereof to the brackets so that the lower portions of the pads are free to pivot outwardly for accommodation to the profile of the nose of the wearer. An inverted U-shaped member, preferably made of resilient wire, straddles the nose pad brackets so that depending legs from the U-shaped member engage the back sides of the nose pads. The back sides of the nose pads are provided with trackways or grooves for reception of spherical elements therein that are mounted on the terminal portions of the legs. Vertical movement of the U-shaped member pivots the nose pads as the spherical elements slide within the nose pad grooves to pivot the pads from the lower spectacle divergent position for normal viewing to the raised spectacle reduced divergent position while the nose pads for close viewing become less divergent as the U-shaped member is depressed vertically.

Other objects and many of the attendant advantages of this invention will become better understood and more readily apparent from the following detailed description taken in conjunction with the accompanying drawing in which like characters of reference designate corresponding elements throughout the several views, and wherein:

FIG. 1 is a fragmentary rear perspective view, somewhat enlarged, of a pair of spectacles embodying the present inventive concept when oriented for utilization in the raised position to view through the lower portions of the bifocal lenses;

FIG. 2 is a fragmentary perspective view similar to FIG. 1, with a portion removed from FIG. 1, illustrating the bridge attachment in the lowered position for normal vision through the major portions of the bifocal lenses;

FIG. 3 is a transverse sectional view taken substantially along the plane of section line 3—3 of FIG. 1;

FIG. 4 is a transverse sectional view taken substantially along the plane of section line 4—4 of FIG. 3 for a single nose pad;

FIG. 5 is a transverse sectional view taken substantially along the plane of section line 5—5 of FIG. 2; and FIG. 6 is a transverse sectional view taken substantially along the plane of section 6—6 of FIG. 5. for a single nose pad.

Referring to the drawing and more particularly to FIGS. 1 and 2 there is illustrated therein a spectacle lens supporting frame 10 of the conventional type having the usual ear-pieces 11, only one of which is shown, pivotally connected by means of the hinge 12 to the sides of the frame 10, and an arched bridge 13 for accommodating the wearer's nose between the lenses 14 mounted within the frame lens recess 15 and the lower supporting rim 16. The distant viewing area of the lenses, designated also by reference character 14, constitutes the major area of each of the lenses with the near view or close vision section 17 of each lens being located in the bottom or lower section of the lens. It will be apparent that although for the purposes of this specification bifocal lenses will be used, it is not intended in any limitative sense as multifocal lenses of several known types may be utilized without departing from the inventive concept regardless of the position occupied by the various lens portions.

On the rear side of the frame 10 there is a pair of nose pads supporting brackets or hangers 18 and 19 affixed to the frame at the lower portions of the arched bridge 13 to project rearwardly. Each bracket is provided with a bend 20 which is spaced from the rear surface of the frame for a purpose to be described hereinafter The end portion of each bracket is bent downwardly for a short reach at the terminal end of which is a nose pad connecting clevis hinge 21. Nose pads 22 and 23, each of which has affixed thereto a cooperating hinge element 29 to form the hinged connection, are connected to brackets 18 and 19, respectively, for pivotal action in a plane substantially parallel to the plane of the frame 10.

The nose pads 22 and 23 may be of the conventional lenticular configuration although the hinged connection is preferably made at the top end of each pad so as to permit the individual pads to pivot outwardly at the lower free ends thereof. It has been found most desirable to fabricate the nose pads of a suitable acrylic thermoplastic material so that the tissue contacting surface 24 may be molded to the contacting contour of the wearer's nose profile thus providing a more comfortable fit. Obviously this is not a requisite and a nose pad having the usual contact surface may be employed provided the additional structural modifications are made to the pad.

As more clearly illustrated by the left nose pad, each of the nose pads will be provided with an elongated trackway or groove 25 on the back side 26 of the pad with the trackway extending for substantially the length of the pad. Limit stop indentations 27 and 28 of hemispherical configuration are formed at the ends of the trackway.

With but several of the structural modifications noted, the frame described above takes the form of a standard frame having pivotable nose pads and may be used in a conventional manner.

To provide an adjusting means for elevating the frame and supporting same in the elevated position during periods of viewing through the reading or close vision sections 17, an auxiliary inverted U-shaped bridge or frame 30 is mounted to the rear side of the spectacle frame. The auxiliary frame 30, preferably formed of resilient wire having a rather high modulus of elasticity, has a transverse reach 31 that extends at least for the span of the hangers 18 and 19 and then the wire is bent downwardly to form depending legs 32 and 33 which legs straddle the hangers. As more clearly shown in FIGS. 3 and 5 the frame legs are guidably confined during vertical movement between the back surface of the frame and the divergent portion of the bend 20. Each of the legs 32 and 33 has an outward return bend 34 intermediate the leg length which increases leg rigidity and provides a bearing surface for contacting the frame to provide guided movement during vertical displacement of the auxiliary bridge. At the lower end of the legs 32 and 33, an inward return loop or bend 35 is made to serve as a limiting guide, if necessary, during vertical movement of the auxiliary bridge should tilting of the bridge tend to occur so that the loop 35 will contact the leading edge of a pad.

The terminal portions of the legs are bent rearwardly out of the plane of the legs and transverse portion and substantially at right angles thereto in order to provide a nose pad engaging open loop 36 with the leg end 37 having a spherical or ball tip 38 which may be introduced into the trackway or groove 25. Trackway 25 and the ball tip 38 form cooperating sliding elements with the ball tip being receivable into the limit stop indentations 27 and 28 at the terminals of the groove.

A nose bridge engaging pad 39 may be formed on the transverse reach 31 of the auxiliary frame with the pad reaching downwardly and having a suitable impression 40 therein to adapt to the bridge of the nose in either position of the spectacles when the pad 39 is in the depressed condition as illustrated in FIGS. 1, 3 and 5.

In operation, the spectacles are normally worn as shown in FIGS. 2, 5 and 6 with the auxiliary bridge in the upward or raised position so that the nose pads are freely pivotable about the hinged connection 21 with but minor restriction imposed by the loops 36 of the legs. In this raised position the nose bridge pad 39 and the other elements constituting the auxiliary bridge are inconspicuous from the front of the spectacles. Also the lower ends of the nose pads will be spread outwardly relative to each other. To use the close vision sections 17 of the lenses, the wearer merely depresses the auxiliary frame member by forcing the transverse section downwardly with one finger from the front of the spectacle frame and simultaneously elevates the arched bridge slightly thus permitting the nose bridge pad to engage the bridge of the nose of the wearer and to slide the auxiliary frame downwardly until the ball tips 38 slide in the grooves sufficiently to be introduced into the limit stop indentations 28 at the lower ends of the nose pads. As will be apparent the distance between the lower ends of the nose pads will converge or pivot inwardly to position the pads slightly higher on the nose of the wearer thus elevating the entire spectacle frame. Sufficient biasing action is placed on the pads to retain the ball tips 38 within the indentations 28 due to the resilience of the wire auxiliary frame.

To return the auxiliary frame to the normal viewing position, one finger or the thumb is placed under the nose bridge pad 39 as the arched bridge is elevated and the pad 39 is urged upwardly to displace the ball tips out of the lower limiting stop indentations 28 and into the upper limiting stop indentation 27, thus permitting the nose pads to pivot freely on the hinged connections.

It will be apparent that in place of a wire auxiliary frame member, other suitable materials may be employed as well as an integral molded member of suitable structural characteristics.

Obviously many modifications and variations may be made in the structure of the auxiliary frame and the nose pads and the cooperating means therebetween without departing from the real purpose and spirit of this invention. Therefore, within the scope of the appended claims many modifications and variations as well as the use of mechanical equivalents are contemplated.

What is claimed is:

1. In combination with spectacles of the character described having a frame for supporting bifocal lenses and an intermediate bridge portion between lenses, an adjusting means for said frame comprising a pair of nose pad supporting hangers projecting divergently from said frame, a nose pad pivotally connected at one end to each of the hangers, each of said nose pads having a nose-engaging surface and a back surface, said back surface being provided with an elongated trackway, the trackway having limit indentations at the terminal ends of the trackway, an inverted U-shaped auxiliary bridge of resilient wire having a transverse section reaching between the hangers and depending legs straddling the divergent hangers, said auxiliary bridge being freely movable vertically, each of said depending legs having a terminal end reaching to communicate with the nose pad trackway, the terminal end of each leg having a bearing member for cooperation with the nose pad trackway and the limit indentations therein whereby by downward displacement of the auxiliary bridge from a raised limiting position to a downward limiting position the nose pads will be pivoted inwardly to permit elevation of the spectacles for vision through a short focal portion of the lenses.

2. An auxiliary bridge framework for use in combination with spectacles having bifocal lenses to elevate the spectacles from a first position to a second position, said spectacles having a bridge with a depending nose contoured section, a pair of nose pad supporting brackets affixed to the nose contoured section, a nose pad pivotally connected to each of said brackets, each nose pad being provided with an indented guideway, and an inverted U-shaped spectacle elevating member straddling said brackets, said elevating member having depending legs, each of said legs having a terminal portion cooperatively received for slidable movement in a nose pad indented guideway to pivot said nose pads.

3. An auxiliary bridge framework for use in combination with a spectacle frame having multifocal lenses and a conventional arched bridge for introduction of the wearer's nose, said spectacle frame comprising a pair of nose pads, means for pivotally supporting the nose pads in spaced relation to each other to the arched bridge, an auxiliary bridge straddling said nose pads and vertically displaceable freely between limits, said auxiliary bridge having depending legs and a nose pad engaging terminal end portion, each of said nose pads having means for receiving and guiding the terminal end portions of the auxiliary bridge legs during vertical movement thereof to pivot said nose pads from a lowered normal viewing position to an elevated close viewing position.

4. In spectacles having a frame and bifocal lenses and a main bridge portion therebetween, an auxiliary spectacle adjusting bridge comprising a pair of nose pad supporting elements affixed to the frame adjacent to the main bridge portion, a nose pad mounted on each of said elements for pivotal movement, each of said nose pads having a nose engaging surface and a rear surface, the rear surface of each nose pad having an elongated groove therein, an inverted U-shaped frame member reaching transversely to straddle and to be slidably received by the pair of nose pad supporting elements, said frame having downwardly extending legs, each of said legs being cooperatively received for sliding engagement within a nose pad groove whereby upon depressing the auxiliary frame the nose pads may be pivoted inwardly.

5. In spectacles of the character described having a frame for retaining multifocal lenses and a bridge portion therebetween, a pair of nose engaging pads having means thereon for pivotally connecting said pads in fixed juxtaposition to the bridge portion of the frame, an auxiliary frame freely movable vertically and having depending nose pad engaging legs, said pads having means for guidably receiving said depending legs during vertical movement of the frame.

6. In spectacles of the character described having a frame for retaining bifocal lenses and a conventional bridge portion therebetween, a pair of nose pad hangers projecting from the frame adjacent to the bridge portion, a nose pad pivotally connected at one end to each of the pad hangers with the free end of each pad being freely suspended downwardly, an auxiliary bridge straddling the hangers for limited vertical movement, said auxiliary bridge having depending legs reaching to engage the nose pads individually, and means on said nose pads for slidably guiding the bridge nose pad engaging legs whereby the nose pads may be pivoted from a downwardly divergent position with the auxiliary bridge elevated to a lesser divergent angle upon depressing the auxiliary bridge.

7. In spectacles having a frame and multifocal lenses and a bridge between lenses; a pair of brackets projecting from the bridge, a nose pad pivotally connected to each of the brackets adjacent to one end of the pad, an inverted U-shaped member reaching transversely to straddle the pair of brackets and having depending legs, said depending legs cooperatively engaging and sliding on the nose pads for pivoting the pads during downward displacement of the U-shaped member to support the spectacles on the wearer in an elevated position.

8. In spectacles having a frame and multifocal lenses and a bridge between lenses, a pair of brackets projecting from the bridge, a nose pad pivotally connected to each of the brackets adjacent to one end of the pad, an inverted U-shaped member reaching transversely to straddle the pair of brackets for guided vertical displacement of said member, a nose bridge rest pad on the U-shaped member, said U-shaped member also having depending legs reaching downwardly to engage the nose pads, means on said nose pads for guidably receiving the depending legs of said U-shaped member whereby upon shifting the U-shaped member from a raised to a depressed position the nose pads are pivoted inwardly toward each other.

References Cited in the file of this patent

UNITED STATES PATENTS

| | | |
|---|---|---|
| 828,924 | Carnes | Aug. 21, 1906 |
| 2,121,336 | Bricker | June 21, 1938 |
| 2,604,816 | Waskiel | July 29, 1952 |
| 2,660,924 | Stegeman | Dec. 1, 1953 |
| 2,685,819 | Page | Aug. 10, 1954 |
| 2,825,266 | Kleinman | Mar. 4, 1958 |

FOREIGN PATENTS

| | | |
|---|---|---|
| 24,124 | Great Britain | of 1903 |